United States Patent
Chen et al.

(10) Patent No.: US 6,487,341 B1
(45) Date of Patent: Nov. 26, 2002

(54) MULTI-MATERIAL STRUCTURE WITH REDUCED POLARIZATION DEPENDENT LOSS AND METHOD THEREFOR

(75) Inventors: Antao Chen, Allentown; Detlef B. Gluszynski, Boyertown; Robert W. Smith, Allentown, all of PA (US)

(73) Assignee: Agere Systems Guardian Corp, Orlando, FL (US)

( * ) Notice: Subject to any disclaimer, the term of this patent is extended or adjusted under 35 U.S.C. 154(b) by 6 days.

(21) Appl. No.: 09/687,615

(22) Filed: Oct. 13, 2000

(51) Int. Cl.[7] ............. G02B 6/26; G02B 6/32; G02B 6/42
(52) U.S. Cl. ............ 385/39; 385/33; 385/34; 385/50
(58) Field of Search ............ 385/34, 11, 33, 385/39, 49, 50, 98, 14, 132

(56) References Cited

U.S. PATENT DOCUMENTS

| | | | |
|---|---|---|---|
| 4,898,441 A | | 2/1990 | Shimizu ............ 350/96.14 |
| 4,966,431 A | | 10/1990 | Heismann ............ 350/96.14 |
| 5,031,983 A | * | 7/1991 | Dillon, Jr. et al. ............ 385/11 |
| 5,212,743 A | | 5/1993 | Heismann ............ 385/11 |
| 5,317,655 A | * | 5/1994 | Pan ............ 385/11 |
| 5,848,203 A | * | 12/1998 | Kawakami et al. ............ 385/11 |
| 5,926,593 A | * | 7/1999 | Asami et al. ............ 385/34 |
| 5,930,414 A | | 7/1999 | Fishman et al. ............ 385/11 |
| 6,040,944 A | * | 3/2000 | Pan et al. ............ 359/590 |
| 6,195,497 B1 | * | 2/2001 | Pan ............ 385/18 |
| 6,198,858 B1 | * | 3/2001 | Pan et al. ............ 385/24 |
| 6,212,305 B1 | * | 4/2001 | Pan ............ 385/11 |

* cited by examiner

*Primary Examiner*—Brian Healy
*Assistant Examiner*—Kevin S Wood

(57) ABSTRACT

The invention includes a multi-material structure comprising at least two components through which light is propagated. At least two structure components are of different materials and are joined to one another at an end surface of each either directly or indirectly. The end surfaces are at angles other than normal to the direction of light propagation. The multi-material structure has a polarization dependent loss less than if the components had end surfaces normal to the direction of light propagation. Embodiments of the invention are particularly applicable to a waveguide substrate/fiber capillary interface. Also included is a method of reducing polarization dependent loss between joined components through which light is propagated.

22 Claims, 2 Drawing Sheets

FIBER CAPILARY

MULTI-MATERIAL STRUCTURE WITH REDUCED POLARIZATION DEPENDENT LOSS AND METHOD THEREFOR

FIELD OF THE INVENTION

The invention relates to multi-material assemblies through which light is propagated, and more particularly to waveguides.

BACKGROUND OF THE INVENTION

Polarization dependent loss (PDL) in a waveguide is caused by the difference of propagation losses between vertically polarized (TM) and horizontally polarized (TE) light waves. Typically, TM light has higher propagation loss than TE light. When a light wave passes through a boundary between two optical materials of different refractive indices, the reflection loss at the boundary also depends on the polarization.

For optical waveguide devices with metal electrodes above and/or below the waveguide, a conventional method of reducing the PDL of a device is to increase the thickness of a buffer layer between the waveguide and an electrode. A thicker buffer layer may cause the device to have a higher operating voltage, which is not desirable. Therefore, a need exists for a waveguide having a reduced PDL while substantially maintaining or reducing its operating voltage.

SUMMARY OF INVENTION

The invention includes a multi-material structure comprising at least two components through which light is propagated. The components are of different materials and are joined at an end surface of each. The end surfaces are at angles other than normal to the direction of light propagation. A device having the multi-material structure has a polarization dependent loss less than if the components had end surfaces normal to the direction of light propagation. Embodiments of the invention are particularly applicable to a waveguide substrate/optical fiber interface.

Also included is a method of reducing polarization dependent loss between joined components through which light is propagated.

DESCRIPTION OF THE DRAWINGS

The invention is best understood from the following detailed description when read with the accompanying drawing figures. In keeping with standard practice of the semiconductor industry, the various features may not be drawn to scale. The dimensions may be drawn out of scale to achieve clarity.

DETAILED DESCRIPTION OF THE INVENTION

When light propagates through an interface of different materials wherein the interface is angle polished so that the normal of the material end faces is in the plane defined by the electric field of TM polarization and the waveguide, TM light has a lower reflection loss than TE light. The difference in reflection loss results in more TM light than TE light passing through the interface which compensates for TM light having a greater propagation loss than TE light. By properly choosing the polishing angle, a different amount of compensation is achievable. This phenomenon is used in embodiments of the invention to compensate for the PDL of an optical material in which more TM light is lost than TE light. The invention is particularly applicable to PDL of waveguides at a substrate/fiber capillary interface.

Advantageously, embodiments of the invention compensate for PDL at the end of a waveguide, and therefore, the waveguide itself does not have to be of low PDL. With the low waveguide PDL limitation removed, a thinner buffer layer may be used and the waveguide device can maintain a lower voltage, and other desirable design specifications. Because PDL is compensated for by increasing the light in the high loss polarization (rather than reducing the light in the low loss polarization), the overall loss of the device is improved.

The principles of the invention will be described in terms of a waveguide substrate/fiber capillary interface which is just one example to which embodiments of the invention are applicable. Those skilled in the art will understand that principles of the invention may also be applied to multi-material assemblies other than waveguides through which light is propagated.

Figure 1:
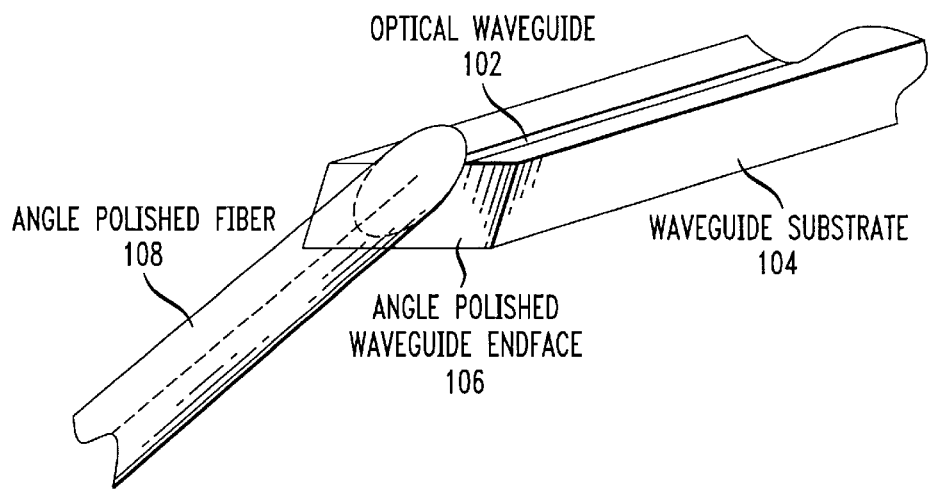
FIG. 1 schematically depicts a perspective view of a fiber capillary joined to a substrate.
Figure 2:
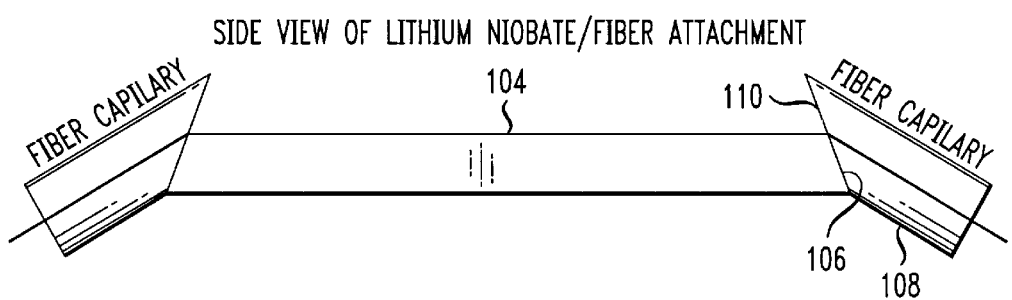
FIG. 2 schematically depicts a side view of fiber capillaries joined to a substrate.

FIG. 1 schematically depicts a waveguide substrate/fiber capillary interface according to an illustrative embodiment of the invention. Optical waveguide 102 is formed in substrate 104. A waveguide substrate end surface 106 is adjacent to a fiber capillary 108 at its end surface 110. FIG. 2 schematically depicts a side view of the waveguide substrate/fiber interface. Light is propagated through fiber capillary 108 and substrate 104.

Fiber capillary end surface 110 and adjacent substrate end surface 106 may have a gap therebetween, may be joined directly or may have one or more intermediary layers therebetween. The intermediary layers may, for example, facilitate attachment of components or enhance the properties or capabilities of the waveguide. The intermediary layers may be joined directly to one another and directly to the capillary and substrate end surfaces, or may have one or more gaps between any components, wherein "components" includes intermediary layers, substrate and capillary. In an illustrative embodiment of the invention, the intermediary layer(s) may have a combined thickness, exclusive of gaps, of about 1000 Å to about $10^5$ Å, with an exemplary thickness of $10^4$ Å.

Figure 3:
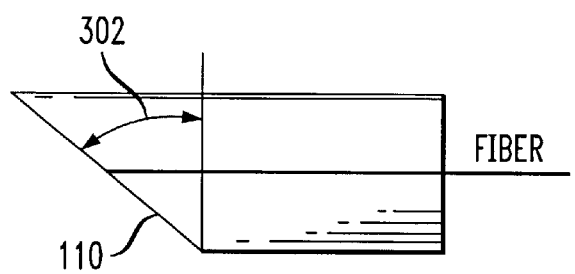
FIG. 3 schematically depicts a side view of a fiber capillary and end surface angle.
Figure 4:
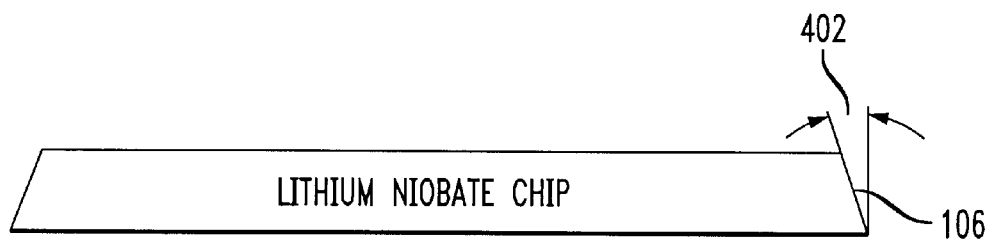
FIG. 4 schematically depicts a side view of a substrate and end surface angle.

FIGS. 3 and 4 depict the angles at which end surfaces 110 and 106 may be formed according to embodiments of the invention, respectively. Capillary end surface 110 is at an angle 302 other than normal to the direction of light propagation through the capillary as shown in FIG. 3. As shown in FIG. 4, substrate end surface 106 is at an angle 402 other than normal to the direction of light propagated through substrate 104. In an exemplary embodiment of the invention substrate angle 402 and capillary angle 302 are substantially complementary to one another. In an exemplary embodiment of the invention, capillary angle 302 is greater than substrate angle 402.

The polish angle of the capillary $\theta_1$, (302) and the polish angle of the substrate $\theta_2$ (402) are determined by solving the following set of equations:

$$PDL_c = -20\, log_{10}(\cos(\theta_1 - \theta_2))$$

$$n_1 \sin\theta_1 = n_2 \sin\theta_2$$

where $PDL_c$ is the polarization dependent loss, $n_1$ is the index of refraction of the capillary, and $n_2$ is the index of refraction of the substrate.

An exemplary case is silica glass fiber with $n_1=1.45$ coupled to a lithium niobate substrate with $n_2=2.22$. In order to achieve a PDL compensation of 0.15 dB, the polishing angle $\theta_1$ and $\theta_2$ are 29°22' and 18°43', respectively.

Illustrative ranges of capillary angles are about 10° to about 40', with an exemplary angle of about 30°. Illustrative ranges of substrate angles are about 5° to about 25°, with an exemplary angle of about 18°.

In an illustrative embodiment of the invention, the substrate is lithium niobate. The substrate, however, may be any substrate material suitable for a waveguide.

Advantageously, the angled substrate and capillary surfaces enable formation of a device having reduced PDL while maintaining or reducing the operating voltage of the device. In an illustrative embodiment of the invention, the operating voltage is in the range of about 1V to about 50V, with an illustrative voltage of 20V.

For applications other than waveguides, the components making up the multi-material structure may be selected from any material through which light is propagated, and in which PDL is reduced by angling the end surfaces according to embodiments of the invention. Adjacent components may have a gap therebetween or be joined directly to one another.

While the invention has been described with specificity, additional advantages and modifications will become apparent to those skilled in the art. For example, end surface angles and structure materials may be varied within the scope of the invention. Accordingly, it is intended that the invention not be limited to specific illustrative embodiments but be interpreted within the full spirit and scope of the appended claims and their equivalents.

What is claimed is:

1. A multi-material structure comprising:
    a first component of a first material through which light is propagated, the first component having an end surface;
    a second component of a second material different from the first material through which light is propagated, the second component having an end surface, the second component end surface adjacent to the first component end surface; and
    wherein the first component end surface is at an angle other than normal to the direction of light propagation through the first component, the second component end surface is at an angle other than normal to the direction of light propagation through the second component; and the angles are such as to reduce reflection loss for the light polarization direction which has a higher propagation loss in the second component than another polarization direction wherein PDL is less than if the first and second component end surfaces are normal to the direction of light propagation.

2. The structure of claim 1 wherein the second component angle and the first component angle are substantially complementary to one another.

3. The structure of claim 1 wherein the first component angle is in the range of about 10° to about 40°.

4. The structure of claim 1 wherein the second component angle is in the range of about 5° to about 25°.

5. The structure of claim 1 wherein the first component is a fiber and the second component is a substrate having a waveguide formed therein.

6. The structure of claim 5 wherein the first component angle is greater than the second component angle.

7. The structure of claim 5 wherein the substrate is lithium niobate.

8. The structure of claim 5 further comprising one or more layers between the fiber and the substrate.

9. The structure of claim 1 wherein the first component end surface and the second component end surface are joined to one another.

10. The structure of claim 1 further comprising one or more layers between the first component and the second component.

11. The structure of claim 8 wherein the layer(s) have a combined thickness in the range of about 1000 Å to about $10^5$ Å.

12. The structure of claim 5 wherein the waveguide has an operating voltage in the range of about 1V to about 50V.

13. A method of reducing polarization dependent loss between joined components, the method comprising:
    providing a first component of a first material, the first component having an end surface, the first component end surface at an angle other than normal to a direction of light propagation through the component; and
    providing a second component of a second material different from the first material, the second component having an end surface, the second component end surface at an angle other than normal to a direction of light propagation through the component, the angles being such as to reduce reflection loss for the light polarization direction which has a higher propagation loss in the second component than another polarization direction.

14. The method of claim 13 wherein the first component angle and the second component angle are substantially complementary to one another.

15. The method of claim 13 wherein the first component angle is in the range of about 10° to about 40°.

16. The method of claim 13 wherein the second component angle is in the range of about 5° to about 25°.

17. The method of claim 13 wherein the first component is a fiber and the second component is a substrate having a waveguide formed therein.

18. The method of claim 17 further comprising providing one or more layers between the substrate and the fiber.

19. The method of claim 18 wherein the layer(s) are provided with a combined thickness in the range of about 1000 Å to about $10^5$ Å.

20. The method of claim 17 wherein the substrate is lithium niobate.

21. The method of claim 13 wherein the first component and the second component end surfaces are joined to one another.

22. The method of claim 17 wherein the waveguide has an operating voltage in the range of about 1V to about 50V.

* * * * *